US012703457B2

(12) United States Patent
Jadhav

(10) Patent No.: US 12,703,457 B2
(45) Date of Patent: Aug. 11, 2026

(54) PEDAL ASSISTED RTO REGISTRABLE ELECTRIC TWO-WHEELED VEHICLE

(71) Applicant: Sachin Anant Jadhav, Pune (IN)

(72) Inventor: Sachin Anant Jadhav, Pune (IN)

( * ) Notice: Subject to any disclaimer, the term of this patent is extended or adjusted under 35 U.S.C. 154(b) by 432 days.

(21) Appl. No.: 18/283,657

(22) PCT Filed: Mar. 17, 2022

(86) PCT No.: PCT/IB2022/052421

§ 371 (c)(1),
(2) Date: Sep. 22, 2023

(87) PCT Pub. No.: WO2022/200939

PCT Pub. Date: Sep. 29, 2022

(65) Prior Publication Data

US 2024/0166301 A1 May 23, 2024

(30) Foreign Application Priority Data

Mar. 22, 2021 (IN) ............................ 202121012283

(51) Int. Cl.
*B62M 6/65* (2010.01)
*B60L 7/10* (2006.01)
(Continued)

(52) U.S. Cl.
CPC ................ *B62M 6/65* (2013.01); *B60L 7/10* (2013.01); *B62J 43/13* (2020.02); *B62J 45/411* (2020.02);
(Continued)

(58) Field of Classification Search
CPC .......... B60L 50/20; B62M 6/60; B62M 6/65; B62M 6/90; B62J 43/13; B62J 45/411
See application file for complete search history.

(56) References Cited

U.S. PATENT DOCUMENTS 4,169,512 A * 10/1979 Ishikawa ................ F02B 75/16 180/205.5
6,598,693 B2 * 7/2003 Honda ................ H02K 21/222 180/220

(Continued)

FOREIGN PATENT DOCUMENTS

EP 2988345 A1 2/2016
JP 2004149001 A * 5/2004 ............. B60L 58/14
TW 202110699 A 3/2021

OTHER PUBLICATIONS

PCT International Search Report for International Application No. PCT/IB2022/052421, mailed Jun. 13, 2022, 3pp.

(Continued)

*Primary Examiner* — Minnah L Seoh
*Assistant Examiner* — Hosam Shabara
(74) *Attorney, Agent, or Firm* — The Roy Gross Law Firm, LLC; Roy D. Gross

(57) ABSTRACT

The present disclosure relates to electric road-legal vehicles, and provides a pedal-assisted RTO registrable two-wheeled electric vehicle (20). The vehicle (20) includes a hub motor (8) mounted on its rear wheel (9) axle, and a pedal assembly (6). The vehicle (20) houses a battery pack (2), and a swing arm. The battery pack (2) drives the hub motor (8) at power greater than 250 Watts and top speed greater than 25 kmph. A sensing unit senses the angular displacement of an accelerator (1) to generate a sensed displacement value. A torque sensor (7) is fitted in the frame near the pedals, to sense the torque applied by the pedal assembly (6) while driving, and generate a sensed torque value. A control module receives the sensed displacement value and the sensed torque value to generate an actuating signal for supplying power from the battery pack (2) to drive the hub motor (8).

10 Claims, 11 Drawing Sheets

(51) Int. Cl.

| | |
|---|---|
| ***B62J 43/13*** | (2020.01) |
| ***B62J 45/411*** | (2020.01) |
| ***B62J 45/413*** | (2020.01) |
| ***B62K 23/02*** | (2006.01) |
| ***B62K 25/28*** | (2006.01) |
| ***B62M 6/50*** | (2010.01) |
| ***B62M 9/00*** | (2006.01) |

(52) U.S. Cl.

CPC ............. *B62J 45/413* (2020.02); *B62K 23/02* (2013.01); *B62K 25/28* (2013.01); *B62M 6/50* (2013.01); *B62M 9/00* (2013.01); *B60L 2200/12* (2013.01)

(56) References Cited

U.S. PATENT DOCUMENTS

| | | | | |
|---|---|---|---|---|
| 7,870,921 | B2 * | 1/2011 | Terada | B62M 6/60 180/219 |
| 9,085,342 | B2 * | 7/2015 | Jauvtis | B62M 6/60 |
| 11,260,935 | B2 * | 3/2022 | Reimers | B62K 11/02 |
| 11,654,990 | B2 * | 5/2023 | Bass | B62J 6/04 280/288.4 |
| 2016/0214675 | A1 * | 7/2016 | DeCordova | B62M 6/65 |
| 2018/0015986 | A1 * | 1/2018 | Tanaka | B62M 6/75 |
| 2020/0377172 | A1 | 12/2020 | Reimers et al. | |
| 2020/0398918 | A1 | 12/2020 | Buell et al. | |
| 2022/0194519 | A1 * | 6/2022 | Denysenko | B62J 43/28 |

OTHER PUBLICATIONS

PCT Written Opinion for International Application No. PCT/IB2022/052421, mailed Jun. 13, 2022, 5pp.

* cited by examiner

PEDAL ASSISTED RTO REGISTRABLE ELECTRIC TWO-WHEELED VEHICLE

CROSS-REFERENCE TO RELATED APPLICATIONS

This application is a National Phase of PCT Patent Application No. PCT/IB2022/052421 having International filing date of Mar. 17, 2022, which claims the benefit of priority of Indian Patent Application number 202121012283, filed Mar. 22, 2021, the contents of which are all incorporated herein by reference in their entirety.

FIELD

The present disclosure relates to electric road-legal two-wheeled vehicles. More specifically the present disclosure relates electric vehicles that are registrable at regional transport office (RTO).

Definition

RTO registrable two-wheeled vehicle: The term 'RTO registrable two-wheeled vehicle' hereinafter in the specification relates to a two-wheeled vehicle having a motor wattage greater than 250 Watts and a top speed greater than 25 kmph.

BACKGROUND

The background information herein below relates to the present disclosure but is not necessarily prior art.

Awareness regarding global warming is increasing among the governments and in general public. With the ever-increasing prices of fossil fuels and their limited reserves, the demand for electric vehicles is rapidly increasing. At the same time, to encourage the use of electric vehicles, governments are providing subsidies and tax benefits on the electric vehicles. However, to qualify for such subsidy the range of the electric vehicle needs to be higher than a predetermined limit (ex. 80 km). To increase the drive range, battery packs with large size and capacity are used, which conversely increases the weight, size, packaging space requirement and more importantly the price of the electric vehicle. as Further, due to the inherent limitation of the battery packs, these electric vehicles have a limited drive range. Hence, in situations where the battery drains off while riding the vehicle, the vehicle has to be pushed or towed to a nearest charging point. At times of urgency, the vehicle may even have to be abandoned for some time, thereby adding to the anxiety of the vehicle owners and thus deterring people from adapting electric vehicles.

Thus, there is a need of a pedal assisted RTO registrable electric two-wheeled vehicle that will ameliorate the drawbacks mentioned above.

OBJECTS

Some of the objects of the present disclosure, which at least one embodiment herein satisfies, are as follows.

An object of the present disclosure is to ameliorate one or more problems of the prior art or to at least provide a useful alternative.

An object of the present disclosure is to provide a pedal assisted RTO registrable two-wheeled electric vehicle.

Another object of the present disclosure is to provide a pedal assisted RTO registrable electric two-wheeled vehicle that has a relatively greater drive range.

Yet another object of the present disclosure is to provide a pedal assisted RTO registrable electric two-wheeled vehicle that can be driven manually in case of low battery level.

Still another object of the present disclosure is to provide a pedal assisted RTO registrable electric two-wheeled vehicle that enables hybrid performance using pedals like in a bicycle and electric bike propulsion in combination.

Still another object of the present disclosure is to provide a pedal assisted RTO registrable electric two-wheeled vehicle that makes transportation affordable.

Yet another object of the present disclosure is to provide a pedal assisted RTO registrable electric two-wheeled vehicle that helps reduce carbon footprint.

One object of the present disclosure is to provide a pedal assisted RTO registrable electric two-wheeled vehicle which is light in weight, has a compact and sleek configuration that helps in ease in transportation.

Other objects and advantages of the present disclosure will be more apparent from the following description, which is not intended to limit the scope of the present disclosure.

SUMMARY

The present disclosure envisages a pedal-assisted RTO registrable two-wheeled electric vehicle. The vehicle comprises a frame, a steerable fork extending from an operative front portion of the frame, a front wheel and a rear wheel mounted to the frame, handle bar mounted on the fork, an accelerator mounted on one side of the handle bar, a seat assembly mounted on the frame operatively behind the handle bar and between the front wheel and the rear wheel, a pedal assembly mounted at the operative above the ground level of the frame between the front wheel and the rear wheel, a hub motor mounted on the rear axle of the rear wheel for driving the rear wheel, a pedal sprocket fitted to the pedal assembly, a chain sprocket fitted to the rear axle, and a drive chain wound around the pedal sprocket and the chain sprocket to assist in driving the vehicle by means of the pedal. The vehicle further comprises a compartment formed by panels fitted around an operative front element of the frame behind the front wheel and the handle bar, and operatively in front of the pedal assembly and the seat assembly. A swing arm is secured between the frame and the rear axle for securing the pedal assembly at the front end and the rear axle at the operative rear end. A battery pack is housed in the compartment. The battery pack is configured to deliver power greater than 250 Watts. Connectors connect the battery pack to the hub motor to drive the hub motor which in turn drives the rear wheel to drive the vehicle at a top speed greater than 25 kmph. A sensing unit is fitted in the accelerator for sensing the angular displacement of the accelerator to generate a sensed displacement value. A torque sensor is fitted in the frame between the pedals. The torque sensor is configured to sense the torque applied by the pedal assembly while driving, and is further configured to generate a sensed torque value and a control module connected to the sensing unit, the torque sensor and the battery pack. The control module is configured to receive the sensed displacement value and the sensed torque value, and is further configured to generate an actuating signal for supplying power from the battery pack to drive the hub motor. The vehicle is configured to be driven in either a battery mode or a pedal assisted mode. The user's action of pedaling will rotate the chain sprocket and hence the rear wheel for driving the vehicle.

BRIEF DESCRIPTION OF THE ACCOMPANYING DRAWING

The pedal assisted RTO registrable electric vehicle, of the present disclosure will now be described with the help of the accompanying drawing, in which.

LIST OF REFERENCE NUMERALS

Figure 1:
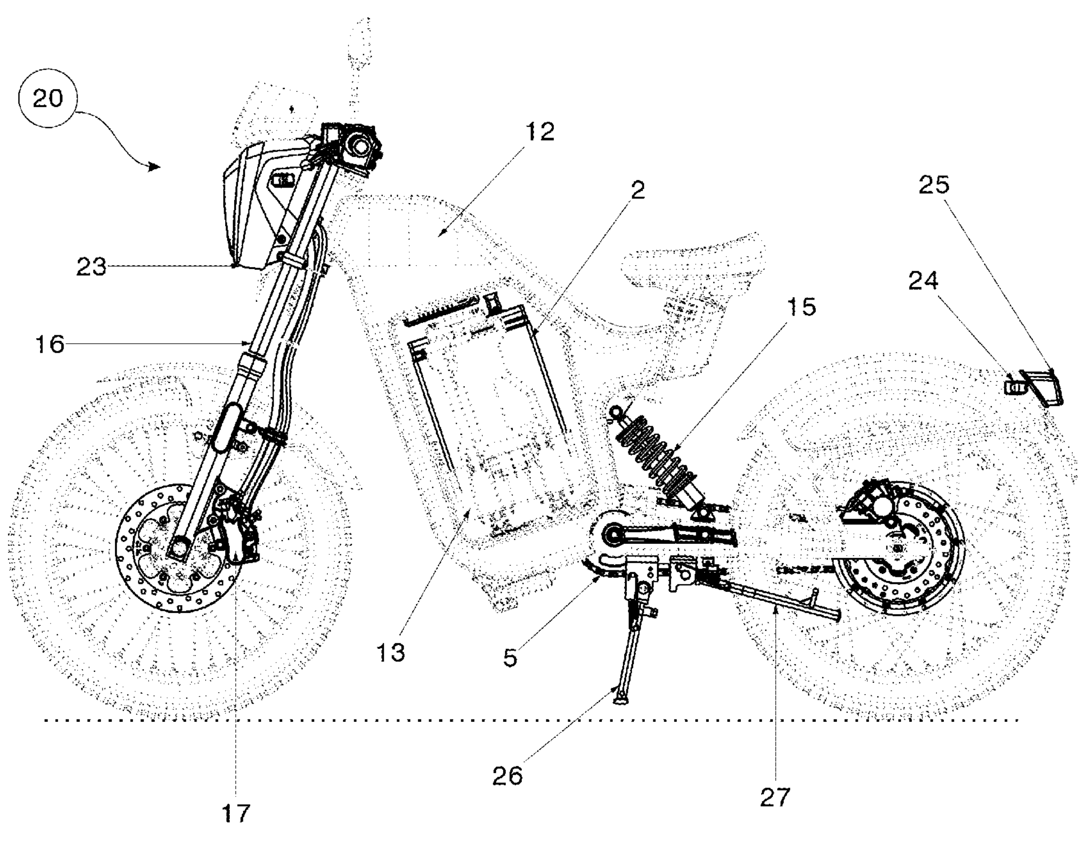
FIG. 1 shows a side view of an electric vehicle with pedals without carriage, in accordance with an embodiment of the present disclosure.

1 accelerator grip
2 battery
3 motor controller unit
4 vehicle control unit
5 drive chain
6 pedal assembly
7 torque sensor
8 rear hub motor
9 rear wheel
10 carrier
11 front wheel
12 body panel
13 battery holder
14 foot rest
15 rear suspension
15*a* rear suspension mount bracket
15*b* rear suspension mount bracket
16 front suspension
17 brake system
17*a* master cylinder
17*b* bypass valve
17*c* brake hose pipe
17*d* brake hose holding wire rod
17*e* front disc
17*f* front caliper
17*g* rear disc
17*h* rear caliper
18 cluster assembly
19 ignition lock
20 pedal assisted electrical vehicle
21 handle bar switch
22 mirror
23 head lamp
24 blinker
25 tail lamp
26 side stand assembly
27 main stand assembly
28 pedal sprocket
29 chain sprocket

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open-ended transitional phrases and therefore specify the presence of stated features, elements, modules, units and/or components, but do not forbid the presence or addition of one or more other features, elements, components, and/or groups thereof.

Figure 2:
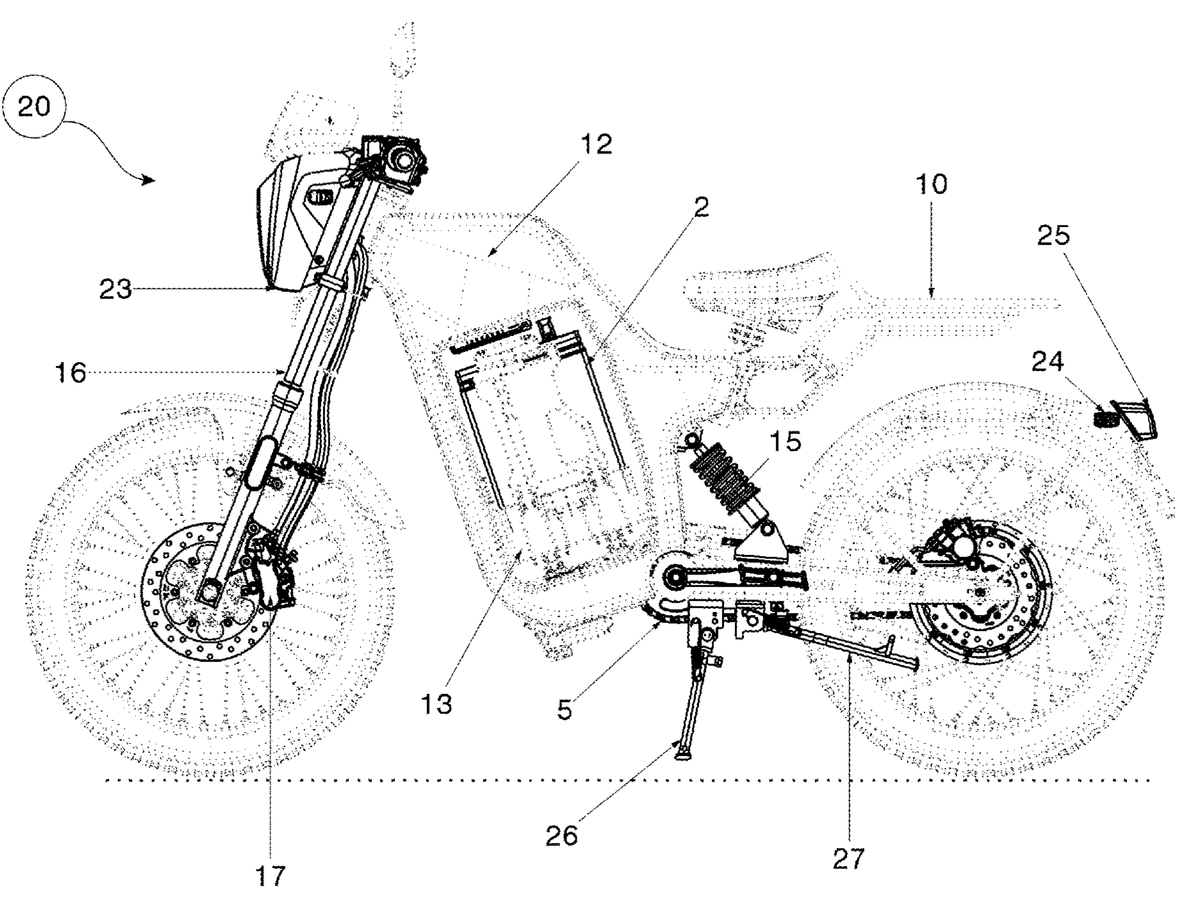
FIG. 2 shows a side view of an electric vehicle with pedals with carriage, in accordance with an embodiment of the present disclosure.
Figure 3:
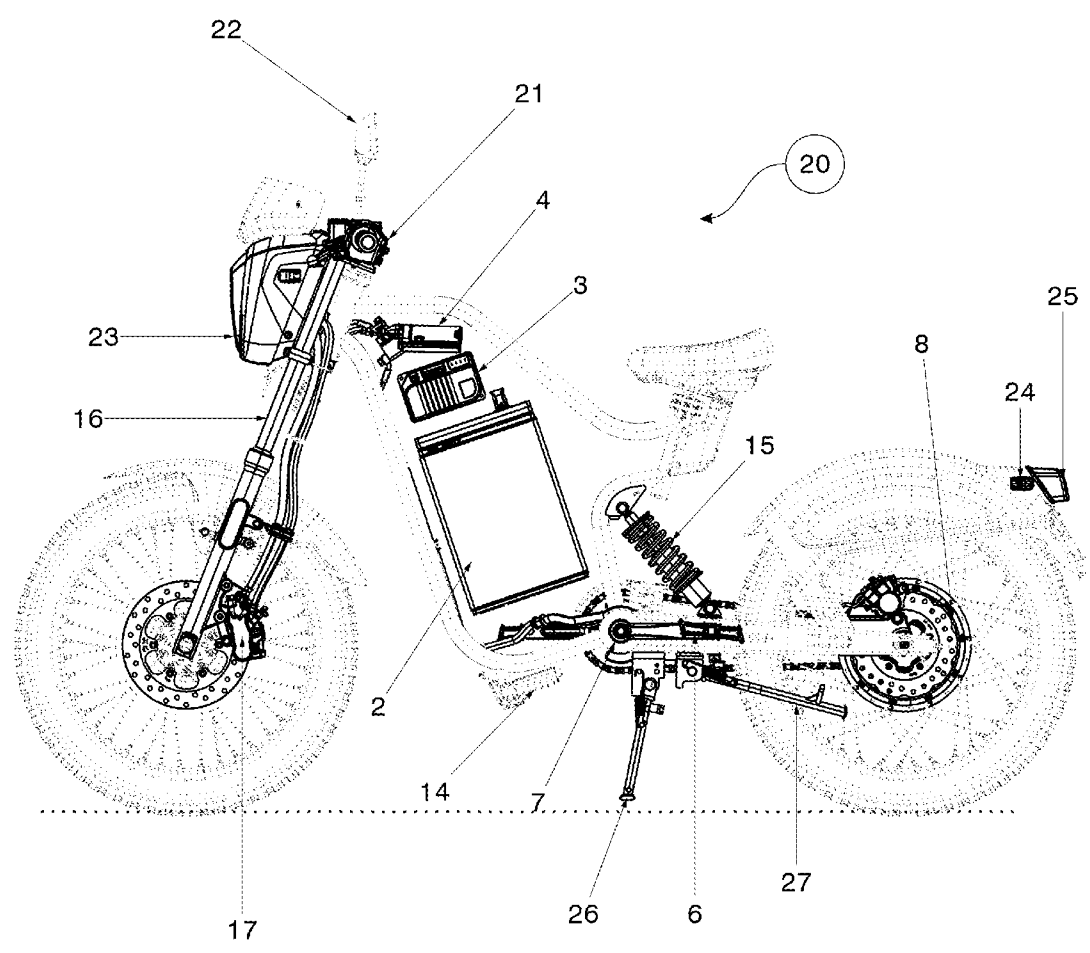
FIG. 3 shows a left side view of the electric vehicle of FIG. 1.
Figure 4:
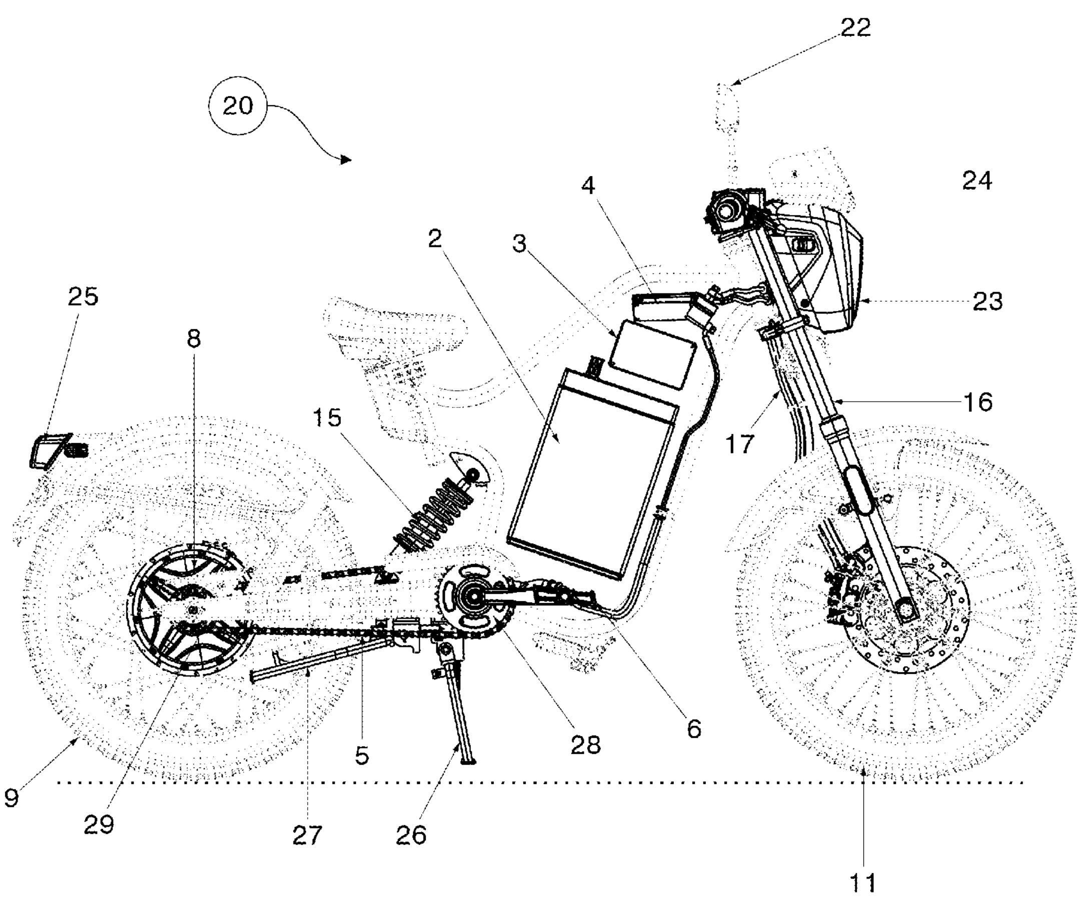
FIG. 4 shows a right-side view of the electric vehicle of FIG. 1.
Figure 5:
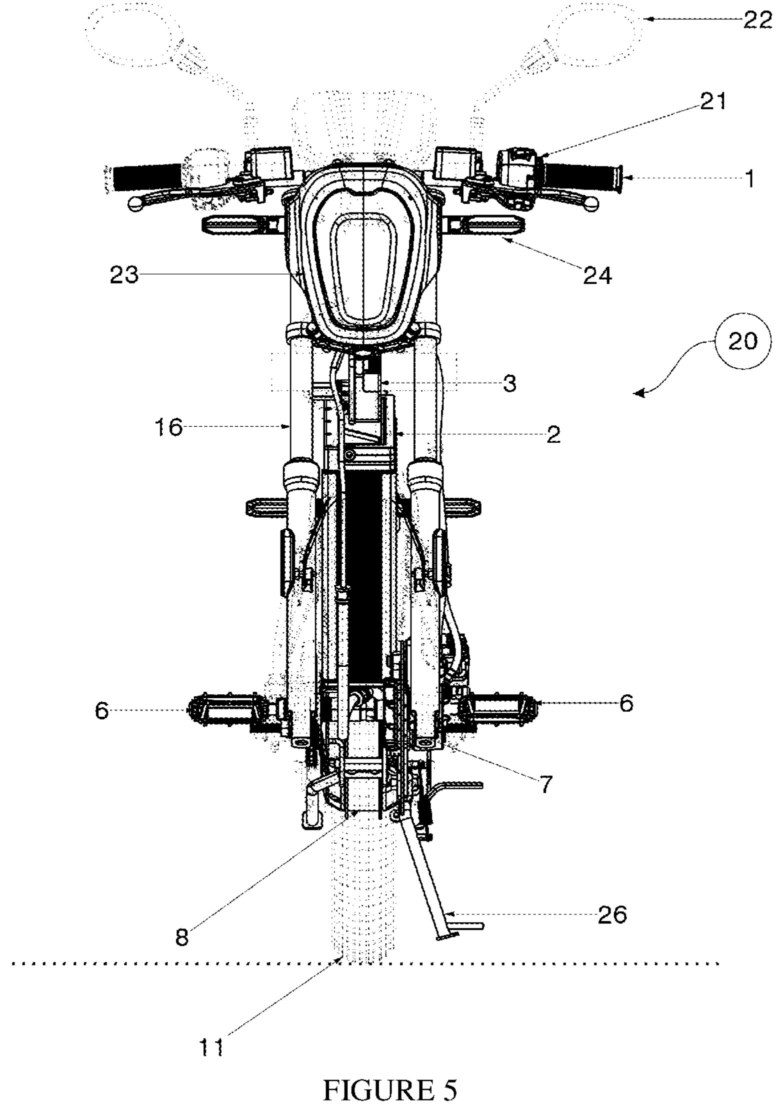
FIG. 5 shows a front view of the electric vehicle of FIG. 1.
Figure 6:
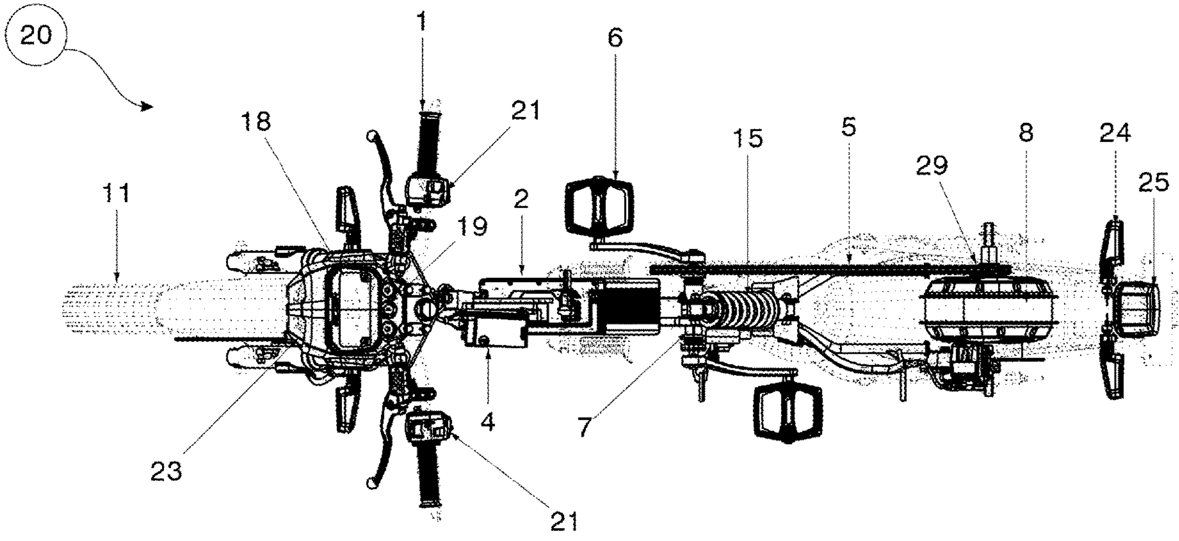
FIG. 6 shows a top view of the electric vehicle of FIG. 1.
Figure 7:
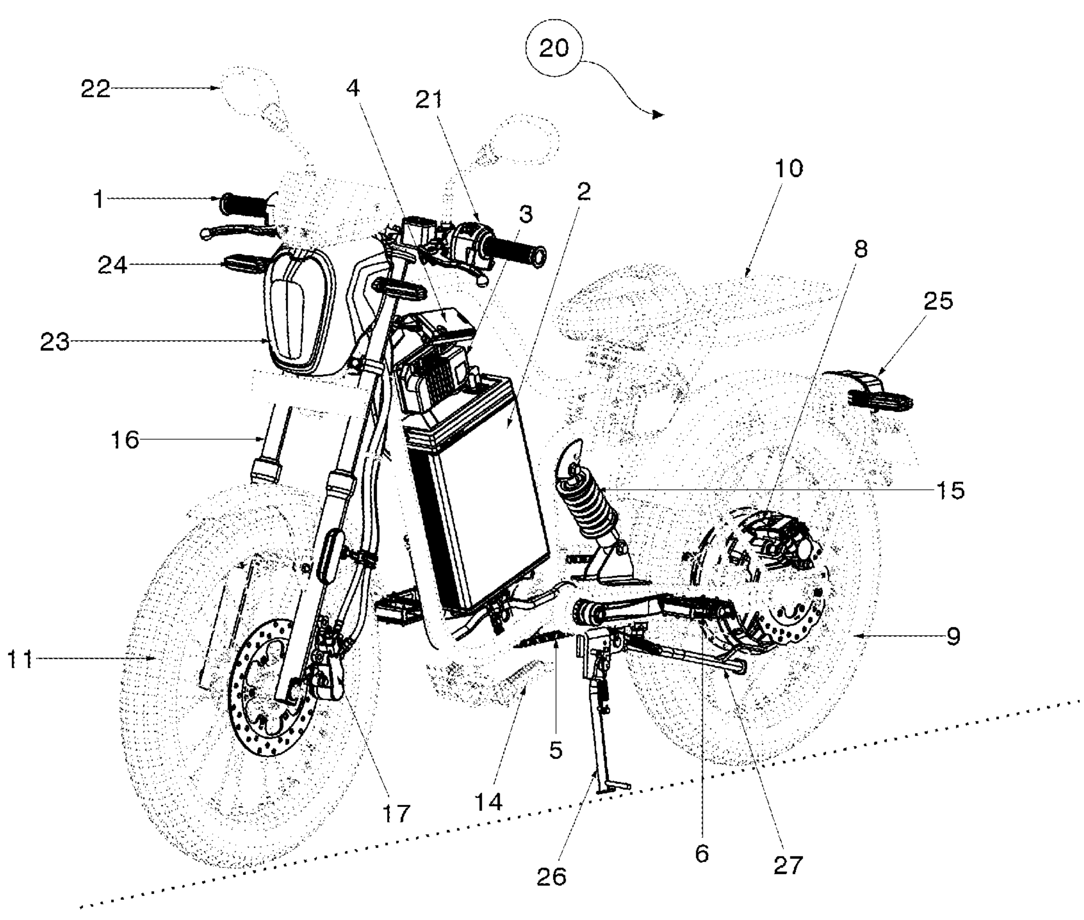
FIG. 7 shows an isometric view of the electric vehicle of FIG. 2.
Figure 8:
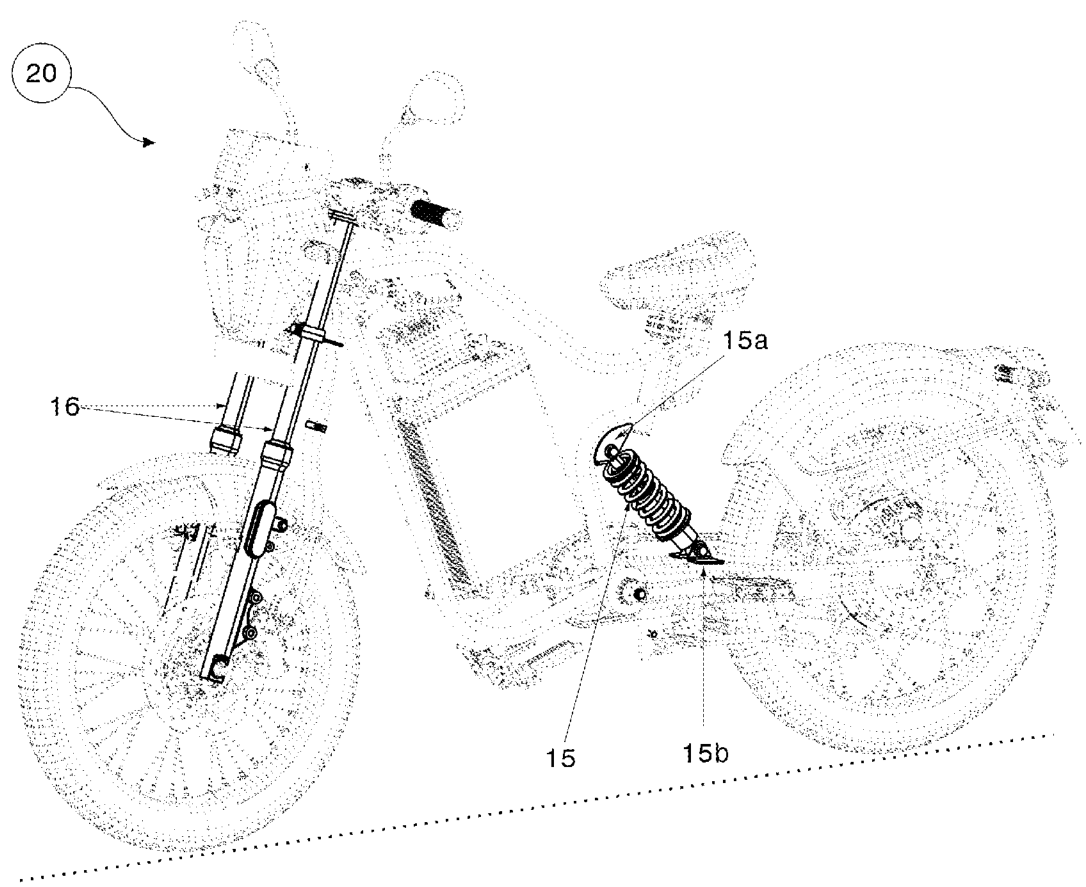
FIG. 8 shows an isometric view of the electric vehicle of FIG. 1, depicting the suspension unit of the vehicle.
Figure 9:
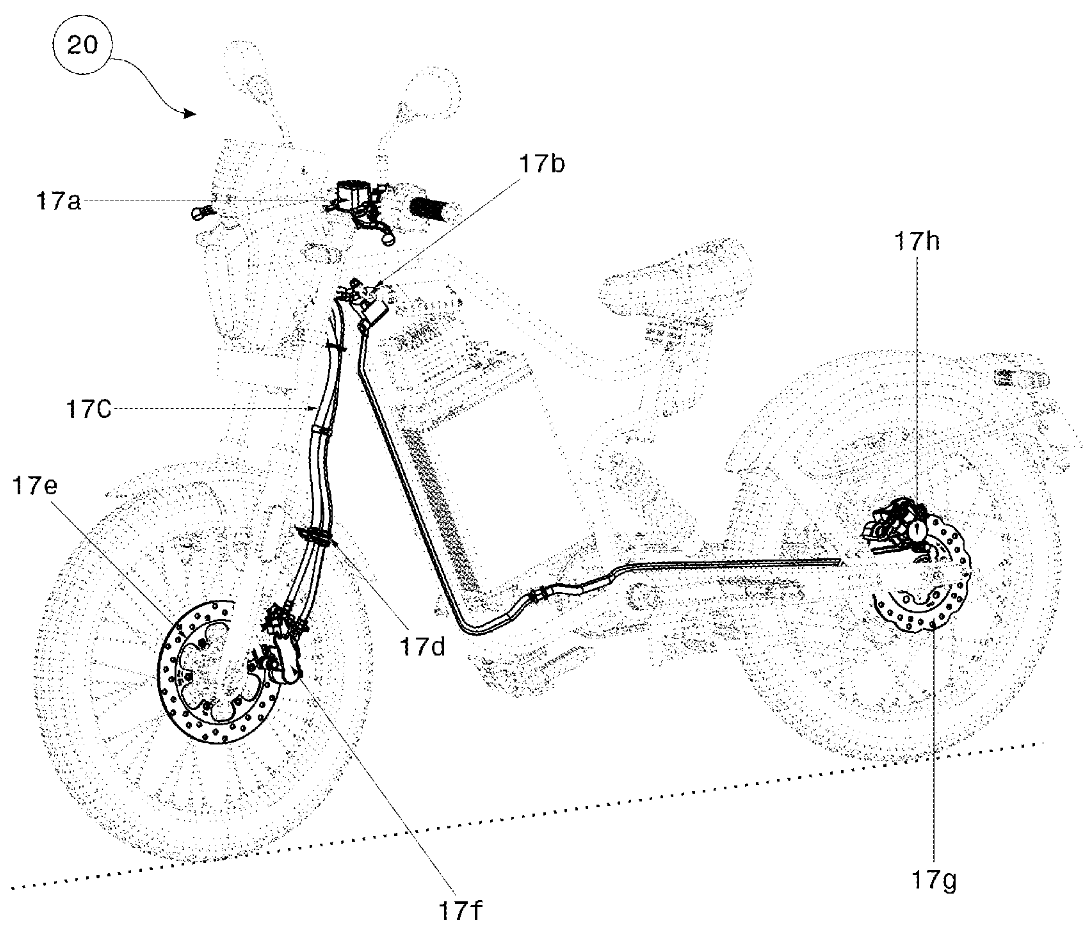
FIG. 9 shows an isometric view of the electric vehicle of FIG. 1, depicting the braking unit of the vehicle.
Figure 10:
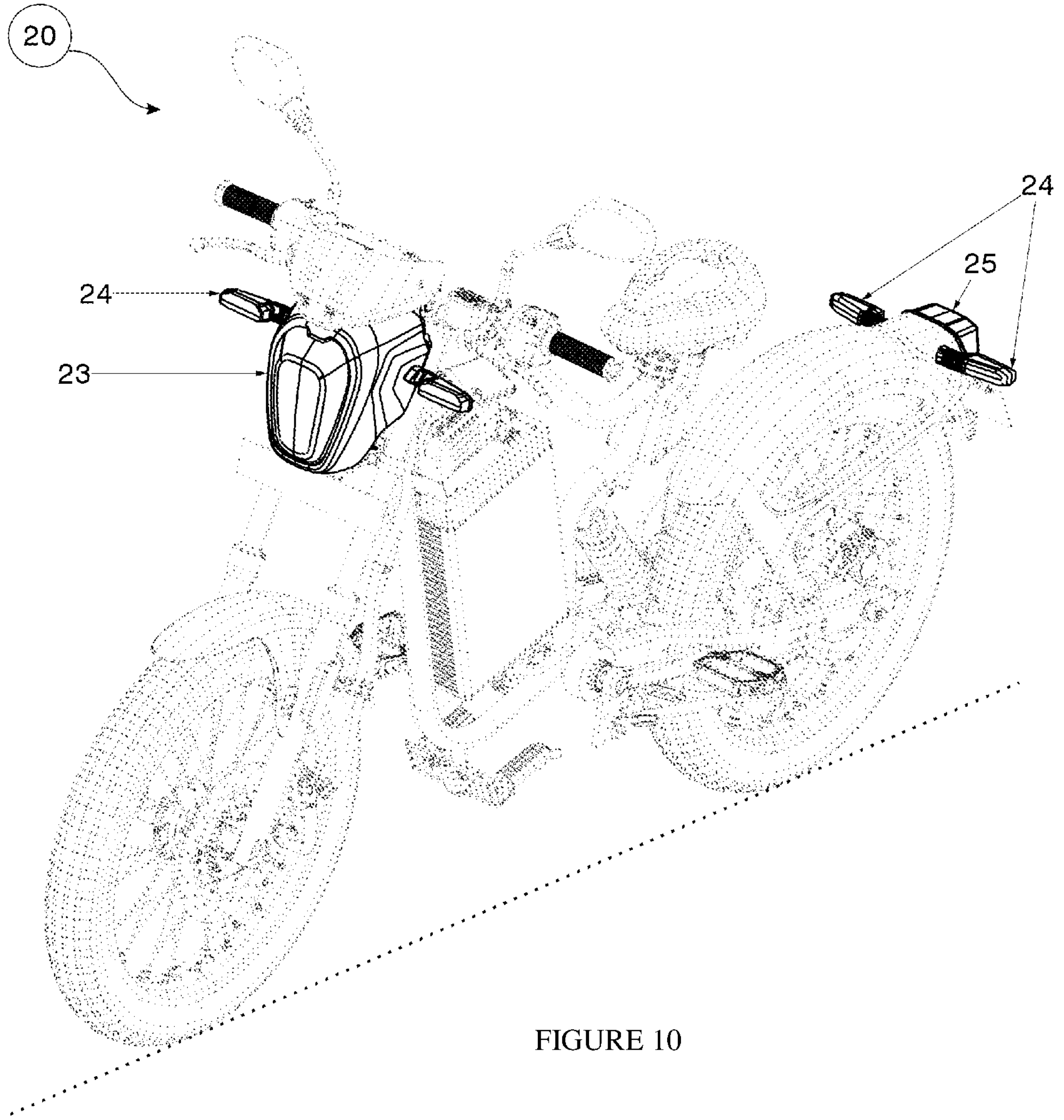
FIG. 10 shows an isometric front view of the electric vehicle of FIG. 1, depicting the front lighting unit of the vehicle.
Figure 11:
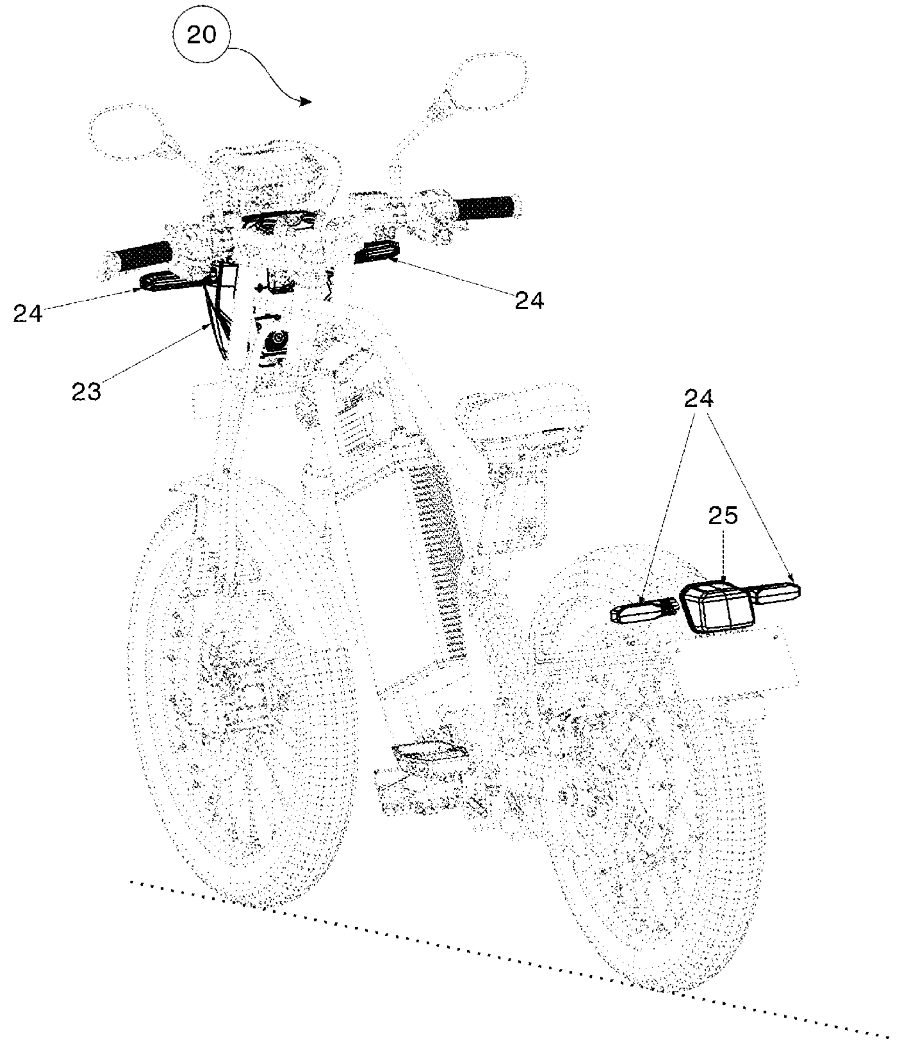
FIG. 11 shows an isometric rear view of the electric vehicle of FIG. 1, depicting the rear lighting unit of the vehicle.

A pedal-assisted RTO registrable two-wheeled electric vehicle (20) of the present disclosure will now be described with reference to FIG. 1 through FIG. 11.

The pedal-assisted RTO registrable two-wheeled electric vehicle (20) (hereinafter referred to as 'the vehicle (20)') includes a frame. A steerable fork extends from an operative front portion of the frame. A front wheel (11) and a rear wheel (9) are mounted to the frame.

Further, handle bar is mounted on the fork. An accelerator (1) is mounted on one side of the handle bar. A seat assembly is mounted on the frame operatively behind the handle bar and between the front wheel (11) and the rear wheel (9). A pedal assembly (6) is mounted at the operative above the ground level of the frame between the front wheel (11) and the rear wheel (9). The vehicle (20) further includes a hub motor (8) mounted on the rear axle of the rear wheel (9) for driving the rear wheel (9). A pedal sprocket (28) is fitted to the pedal assembly (6), while a chain sprocket (29) is fitted to the rear axle. A drive chain (5) is wound around the pedal sprocket (28) and the chain sprocket (29) to assist in driving the vehicle (20) by means of the pedal.

In an embodiment, the frame is defined by a top tube, a seat tube and a down tube. In another embodiment, a bottom bracket is fitted between the seat tube and the down tube. The bottom bracket is configured to allow mounting of a pedal axle of the pedal assembly (6) therein.

The vehicle (20) comprises a compartment formed by panels (12) fitted around an operative front element of the frame behind the front wheel (11) and the handle bar, and operatively in front of the pedal and the seat. A swing arm is secured between the frame and the rear axle for securing the pedal assembly (6) at the front end and the rear axle at the operative rear end.

In an embodiment, the vehicle (20) includes a front suspension unit (16) provided in the fork. A rear suspension unit (15) is connected to the frame operatively below the seat assembly for absorbing the shocks as the vehicle (20) traverses on a ground surface. In an embodiment, the rear suspension unit (15) is connected to the frame and the swing arm with the help of mounting brackets (15*a*, 15*b*).

In an embodiment, the suspension units (16, 15) are hydraulically driven.

The pedal assembly (6) is configured to manually drive the rear wheel (9), while the battery and the hub motor are together configured to power and drive the rear wheel (9).

The vehicle (20) further comprises a battery pack (2), connectors, and a sensing unit. The battery pack (2) is configured to be housed in the compartment, typically the battery holder (13). The battery pack (2) is configured to deliver power greater than 250 Watts. In an embodiment, the battery pack (2) is configured to deliver power up to 15000 Watts. The connectors connect the battery pack (2) to the hub motor (8) to drive the hub motor (8) which in turn drives the rear wheel (9) to drive the vehicle (20) at a top speed greater than 25 kmph. The sensing unit is fitted in the accelerator (1) for sensing the angular displacement of the accelerator (1) to generate a sensed displacement value.

The vehicle (20) of the present disclosure thus satisfies the requirements of motor wattage, top speed, and driving range, and is hence a RTO registrable electric two-wheeled vehicle.

In an embodiment, the vehicle (20) includes a hydraulic braking system (17). In another embodiment, the braking system is a combined braking system (CBS) which is connected to the front wheel (11) and the rear wheel (9) with the help of brake discs (17*e*, 17*g*) and brake calipers (17*f*, 17*h*). The combined braking system is configured to be actuable at the handle bar for actuating either of the front or rear brakes.

The vehicle further comprises a torque sensor (7) and a control module. The torque sensor (7) is configured to be fitted in the frame between the pedals. The torque sensor (7) is configured to sense the torque applied by the pedal assembly (6) while driving, and is further configured to generate a sensed torque value.

In an embodiment, the vehicle (20) includes a pedal assist sensor.

In an embodiment, the vehicle (20) includes a rear mudguard. In an embodiment, the vehicle (20) is a non-carriage vehicle. In another embodiment, the vehicle (20) includes a carriage. In yet another embodiment, the configuration of the rear mudguard is varied to accommodate the carriage.

The control module is connected to the sensing unit, the torque sensor (7) and the battery pack (2). The control module is configured to receive the sensed displacement value and the sensed torque value. The control module is further configured to generate an actuating signal for supplying power from the battery pack (2) for driving the hub motor (8).

In an embodiment, the control module comprises a motor control unit (3) and a vehicle control unit (4). In another embodiment, the motor control unit (3) and the vehicle control unit (4) are connected to a processing unit. The processing unit is configured to analyse the sensed values and actuate the battery pack (2) to supply power to the hub motor (8).

In another embodiment, the motor control unit (3) and the vehicle control unit (4) are connected to a controller area network (CAN) which analyses the health of the vehicle. CAN is further configured to send notifications to a remote device to alert the user about the health of the vehicle (20). CAN is additionally configured to send notifications related to the location of the vehicle to the remote device.

In one embodiment, the vehicle (20) includes a throttle and handle bar speed mode switch. In one embodiment, the vehicle (20) includes an analog-to-digital converter configured to cooperate with the sensing unit, the torque sensor (7) and/or the pedal assist sensor to generate an analog signal corresponding to the sensed signals of the speed and torque. The analog signal is converted into digital signals which are received by the motor control unit (3). The motor control unit (3) transmits the received signals to the processing unit which actuates the battery pack (2) to supply power to the hub motor (8) based on the selected throttle position, speed mode and gear.

In another embodiment, signals related to throttle, handlebar mode and gear selecting signals are transmitted to the analog-to-digital converter. In yet another embodiment, the signals are received by any other communication interface.

In an embodiment, the vehicle (20) includes the motor control unit (3) only.

The control unit is configured to analyse the sensed displacement value and the sensed torque value to generate the first actuating signal and the second actuating signal. It is required that the sensed values are continuously sent to the respective control modules, so that the actuating signals are transmitted in RealTime. In an embodiment, the actuating signals are further received by various servers, the instrument cluster and the cloud of the vehicle (20), communicating with the control modules.

In one embodiment, the vehicle (20) includes a regenerative braking system which comprises a brake switch sensor (not shown in figures). The brake switch sensor is configured to generate a brake sensed signal when the brakes are applied. The processing unit receives the brake sensed signal to cut-off the battery supply to the motor (8). The power that has already been delivered by the battery pack (2) before applying the brakes is redirected back to the battery pack (2), thereby saving power.

The vehicle (20) is configured to be used as an electric two-wheeled vehicle (20) or as a pedaled two-wheeled vehicle (20), or a hybrid two-wheeled vehicle (20) which utilizes both electric and pedaled modes of riding. More specifically, the vehicle (20) can be used for five different riding conditions that are as follows:

Electric mode;

Accelerator+pedal (battery assistance while pedaling)

Pedal (battery assistance while pedaling) without accelerator

Pedal (battery assistance at 15% reserve which means zero accelerator available)

Pedal only (battery fully discharged)

The working of the various conditions will be described as below:

First Condition: Accelerator

The sensing unit transmits a sensed displacement signal based on the angular displacement of the accelerator (1) to the motor control unit (MCU) (3). The MCU analyses the power required from the battery pack (2), and generates an actuating signal to supply power to the hub motor (8) to drive the vehicle (20).

Second Condition: Accelerator+Pedal (Battery Assistance while Pedaling)

The sensing unit transmits a sensed displacement signal based on the angular displacement of the accelerator (1) to the motor control unit (MCU) (3). Simultaneously, the torque sensor (7) generates the sensed torque value which is received by the vehicle control unit (VCU) (4).

The VCU further processes the sensed torque value, and transmits the processed value to the MCU which supplies the power required from the battery and delivers the power to the motor to drive the vehicle (20).

Third Condition: Pedal (Battery Assistance while Pedaling) without Accelerator

The torque sensor (7) generates the sensed torque value which is received by the vehicle control unit (VCU) (4). The VCU calculates and converts these signals and transmits the signals to CAN and the MCU. The MCU calculates based on this input, the power required from the battery while considering the pedaling effort and delivers required power accordingly to the motor to drive the vehicle (20).

Fourth Condition: Pedal (Battery Assistance at 15% Reserve which Means Zero Accelerator Available)

The torque sensor (7) generates the sensed torque value which is received by the vehicle control unit (VCU) (4). The VCU calculates and converts these signals and transmit to CAN and the MCU. The MCU calculates based on this input, the power required from the battery while considering the pedaling effort and delivers required power accordingly to the motor to drive the vehicle (20). However, in this condition, even if the sensed displacement value is transmitted, no communication of the same is sent to the MCU.

Fifth Condition: Pedal Only (Battery Fully Discharged)

In this condition, the vehicle (20) will function as a bicycle, without transmitting any signal to the control unit. The pedal only mode can also be used for a user to consider the vehicle as an exercise bike. In an embodiment, the vehicle (20) includes a plurality of sensors to track the health of the user and a display unit for displaying the information related to the health of the user thereon.

In one embodiment, the sensing unit is a throttle position sensor.

In an embodiment, the vehicle (20) includes a telematics device.

In an embodiment, the vehicle (20) includes a chain adjuster assembly fitted to the rear wheel (9) axle for adjusting the slack of the drive chain (5).

In another embodiment, the vehicle (20) includes a cluster assembly (18) provided on a tiltable display, and an ignition lock (19) provided on the handle bar. The tiltable display is configured to show the speed of vehicle, distance travelled, battery charging status and other all input signals sent by the MCU (3) in analogue and digital format to show the status of vehicle on the display.

In yet another embodiment, the vehicle (20) further includes a handle bar switch (21), at least one mirror (22), a head lamp (23), and blinkers (24) provided on the handle bar. In another embodiment, the vehicle (20) includes tail lamp (25) and blinkers (24) provide on the mudguard.

In an embodiment, the vehicle (20) includes a main stand assembly (27) and a side stand assembly (26).

Electric assistance while pedaling is advantageous for road-legal electric two-wheeled vehicles, since rapid battery charging facilities may not always be available everywhere.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and all such modifications are considered to be within the scope of the present disclosure.

TECHNICAL ADVANCEMENTS

The present disclosure described hereinabove has several technical advantages including, but not limited to, the realization of a pedal assisted RTO registrable two-wheeled electric vehicle, that:

- provides better riding range in a single charge;
- can be manually powered via pedals in the event of low battery level;
- can be used as exercising equipment;
- meets the government criteria (L1 and L2);
- is affordable than electric vehicles with similar performance parameters;
- is light weight, and hence can be carried inside home by user;
- is reliable and easily serviceable in existing bicycle shops;
- has an On Board Diagnostic (OBD) device to provide information for maintenance;
- has in-built GPS navigation system;
- can be locked using a mobile or web application;
- can be box packed easily;
- encourages rider to improve body fitness;
- can be used for goods/cargo carrier and utility purposes;
- can be integrated with virtual game stations, TV, projectors to facilitate playing virtual bi-cycle games;
- is easy to track for safety; and
- can share information with users on mobile and uses CAN communication.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A pedal-assisted RTO registrable two-wheeled electric vehicle (20) including a frame, a steerable fork extending from an operative front portion of the frame, a front wheel (11) and a rear wheel (9) mounted to the frame, handle bar mounted on the fork, an accelerator (1) mounted on one side of the handle bar, a seat assembly mounted on the frame operatively behind the handle bar and between the front wheel (11) and the rear wheel (9), a pedal assembly (6) mounted at an operative height above the ground level of the frame between the front wheel (11) and the rear wheel (9), a hub motor (8) mounted on a rear axle of the rear wheel (9) for driving the rear wheel (9), a pedal sprocket (28) fitted to the pedal assembly (6), a chain sprocket (29) fitted to the rear axle, and a drive chain (5) wound around the pedal sprocket (28) and the chain sprocket (29) to assist in driving the vehicle (20) by means of the pedal, said vehicle (20) comprising:

- a compartment formed by panels (12) fitted around an operative front element of the frame behind the front wheel (11) and the handle bar, and operatively in front of the pedal assembly (6) and the seat assembly;
- a swing arm secured between the frame and the rear axle for securing the pedal assembly (6) at the front end and the rear axle at an operative rear end;
- a battery pack (2) housed in said compartment (13), said battery pack (2) configured to deliver power greater than 250 Watts;
- connectors connecting the battery pack (2) to the hub motor (8) to drive the hub motor (8) which in turn drives the rear wheel (9) to drive the vehicle (20) at a top speed greater than 25 kmph;
- a sensing unit fitted in the accelerator (1) for sensing the angular displacement of the accelerator (1) to generate a sensed displacement value;
- a torque sensor (7) fitted in the frame between the pedals, said torque sensor (7) configured to sense the torque applied by the pedal assembly (6) while driving, and further configured to generate a sensed torque value; and
- a control module connected to said sensing unit, said torque sensor (7) and said battery pack (2), said control module configured to receive said sensed displacement value and said sensed torque value, and further configured to generate an actuating signal for supplying power from the battery pack (2) to drive the hub motor (8);

wherein the vehicle (20) can be driven in either a battery mode or a pedal assisted mode, wherein the user's action of pedaling will rotate the chain sprocket (29) and hence the rear wheel for driving the vehicle (20).

2. The vehicle (20) as claimed in claim 1, wherein said control module includes a motor control unit (3) and a vehicle control unit (4), said motor control unit (3) configured to communicate with said sensing unit to receive said sensed displacement value, and said vehicle control unit (4) configured to communicate with said torque sensor to receive said sensed torque value.

3. The vehicle (20) as claimed in claim 2, wherein said motor control unit (3) and said vehicle control unit (4) are connected to a processing unit, said processing unit configured to analyse the sensed values and actuate the battery pack (2) to supply power to the hub motor (8).

4. The vehicle (20) as claimed in claim 1, which includes a chain adjuster assembly fitted to the rear wheel (9) axle for adjusting the slack of the drive chain (5).

5. The vehicle (20) as claimed in claim 1, which includes a front suspension unit (16) provided in the fork.

6. The vehicle (20) as claimed in claim 1, which includes a rear suspension unit (15) connected to the frame operatively below the seat assembly for absorbing the shocks as the vehicle traverses on a ground surface.

7. The vehicle (20) as claimed in claim 3, which includes a regenerative braking system comprising a brake switch sensor, said brake switch sensor configured to generate a brake sensed signal on application of the brakes to cause the processing unit to cut-off the power supply to the motor (8), and redirect the power already delivered to the motor (8) back to the battery pack (2).

8. The vehicle (20) as claimed in claim 1, which includes a carriage.

9. The vehicle (20) as claimed in claim 1, which is a non-carriage vehicle.

10. The vehicle (20) as claimed in claim 1, the sensing unit is a throttle position sensor.

* * * * *